(12) United States Patent  (10) Patent No.: US 7,629,547 B2
Heath et al.  (45) Date of Patent: Dec. 8, 2009

(54) ILLUMINATING OF AN ELECTRICAL DEVICE

(75) Inventors: Jonathan Heath, Hampshire (GB); Caroline Millar, Surrey (GB); Hutch Hutchison, Hampshire (GB); Pekka Juhana Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/410,535

(22) Filed: Apr. 24, 2006

(65) Prior Publication Data

US 2007/0246336 A1    Oct. 25, 2007

(51) Int. Cl.
    *H01H 9/00* (2006.01)
(52) U.S. Cl. ...................................... 200/310; 200/317
(58) Field of Classification Search ............... 200/310, 200/308, 313, 314, 317
    See application file for complete search history.

(56) References Cited

U.S. PATENT DOCUMENTS

| 4,124,879 A | | 11/1978 | Schoemer | 362/26 |
|---|---|---|---|---|
| 5,128,842 A | * | 7/1992 | Kenmochi | 200/314 |
| 5,408,060 A | * | 4/1995 | Muurinen | 200/314 |
| 5,510,782 A | | 4/1996 | Norris et al. | 341/22 |
| 5,574,446 A | * | 11/1996 | Dittrich et al. | 200/5 A |
| 5,708,428 A | | 1/1998 | Phillips | 341/22 |
| 5,746,493 A | | 5/1998 | Jonsson et al. | 362/31 |
| 5,815,225 A | * | 9/1998 | Nelson | 362/26 |
| 6,036,326 A | * | 3/2000 | Yoshikawa et al. | 200/314 |
| 6,040,822 A | | 3/2000 | Decker | |
| 6,087,600 A | * | 7/2000 | Kaufmann et al. | 200/5 A |
| 6,664,486 B2 | * | 12/2003 | Yoon et al. | 200/5 A |
| 6,670,750 B2 | * | 12/2003 | Hanahara et al. | 200/513 |
| 6,765,503 B1 | * | 7/2004 | Chan et al. | 200/310 |

FOREIGN PATENT DOCUMENTS

| DE | 299 11 406 | 11/1999 |
|---|---|---|
| DE | 102 45 629 | 4/2004 |
| GB | 2344564 | 6/2000 |

* cited by examiner

*Primary Examiner*—Michael A Friedhofer
*Assistant Examiner*—Marina Fishman
(74) *Attorney, Agent, or Firm*—Ware, Fressola, Van Der Sluys & Adolphson LLP

(57) ABSTRACT

Present invention enables to illuminate an artwork or alphanumerics of related key(s) of an electrical device from above with illumination module situated in the vicinity of the artwork or alphanumerics. Present invention also enables the use of opaque material in the keys or in the keypad.

19 Claims, 5 Drawing Sheets

ILLUMINATING OF AN ELECTRICAL DEVICE

FIELD OF THE INVENTION

This invention relates in generally to the field of illuminating of an electrical device and, more particularly, illuminating an artwork or alphanumerics of an electrical device from above. The artwork or alphanumerics can be situated on top of a key(s) or next to the related key(s).

BACKGROUND OF THE INVENTION

Conventionally, the illumination of an electrical device is done with backlighting a key or a keyboard. One type of backlit keyboard is fabricated by moulding a keypad device, including the keys and pad thereof, of light-transmitting rubber. An opaque character is formed on the top of each key by an opaque ink or the like. Light can also be transmitted through light-conducting channels formed in a keypad. Another type of backlit keypad device passes light only through character forming openings at the top of the keys, this second type being called as "reverse graphics illumination".

Such solutions for illumination of an electrical device are presented for example in U.S. Pat. No. 5,708,428, GB 2 344 564 A, U.S. Pat. No. 5,746,493, U.S. Pat. No. 4,124,879 and U.S. Pat. No. 5,510,782. In U.S. Pat. No. 5,708,428 the light-emitting diodes are embedded, preferably by insert moulding, directly into translucent elastomeric material forming a keypad or surrounding structure adjacent the light guide of a liquid crystal display panel. Light is diffused into the translucent keypad and dispersed in a manner that provides backlighting for each of the keys of the keypad.

In GB 2 344 564 A is presented a luminous body for a mobile phone assembly, comprising at least one plane light-guide element adapted to distribute light within the mobile unit assembly, at least one distance element to mount the plane light guide element to a circuit board with a predefined distance therebetween, wherein the distance element is formed with a cavity to accommodate a light source. With this arrangement another type of backlighting is achieved.

In U.S. Pat. No. 5,746,493 is presented a more effective lightguide to distribute a light from light source to a display and keyboard. A plurality of light coupling recesses are provided on the peripheral edge to transmit light into the light guide. The light coupling recesses are preferably accurately shaped, and more preferably semicircular to guide light from the light sources uniformly into the lightguide avoiding bright and dark regions. With this arrangement is achieved more homogenous backlighting to a device.

In U.S. Pat. No. 4,124,879 light is distributed around the keypad from a light source on the side of the keypad through light-conducting channels situated between the rows of keys. The channels are provided with matt and reflecting painted surfaces for directing the light. This arrangement is also used to achieve more homogenous backlighting to a device.

In U.S. Pat. No. 5,510,782 the keypad device includes one or more separate key portions or keys that each includes a shell of elastomeric material having top and side walls and forming a cavity therewithin. Each key also includes an insert of light transmitting material lying in the cavity, with the top of the insert supporting the top wall of the shell. Openings are formed in the top wall of the shell, preferably with laser beam, so light passing upwardly through the insert can pass through the openings to form an illuminated character. This backlighting solution is called "reverse graphics illumination."

All mentioned prior art solutions are illuminating a key or a keypad from back side of the object to be illuminated so that the light passes at least partly through the illuminated object. In other words the illumination is arranged from under the illuminated object and called backlighting.

These prior art solutions have one or more of following disadvantages in being used with opaque materials such as metals: associated problems with laser drilled key caps, expenses of the laser drilling, difficulty in seeing characters in half light due to diminishing contrast, impossible use of non transparent keys, not uniform illumination of keys or keyboards, etc.

SUMMARY OF THE INVENTION

The present invention overcomes the drawbacks of the above mentioned prior art solutions having backlit keyboards by providing the illumination to the artwork or alphanumerics of an electrical device from above of the object to be illuminated.

According to one aspect of the invention the illumination from above to the artwork or alphanumerics of an electrical device is achieved with flat key or flat panel with keys forming a keyboard having at least one LED or plurality of LEDs along one edge of illuminated area forming an illumination module. Also another light source can be used such as an electro luminence panel(s). In this arrangement the illumination module can also include a lens and a reflector surface. The light from LED(s) is directed with lens and reflector to illuminate a wanted area including one key or a whole keypad. Artwork or alphanumerics can be printed either on the keys or on the area between the keys. Also artwork or alphanumerics can be raised or recessed for better visibility.

According to another aspect of the invention, the illumination of the artwork or alphanumerics is arranged with tilted key(s) or keypad. Light transmitting material (lightguide) or a light source (LED) is situated in the vicinity of the lower end of the tilted key(s) or keypad so that the light transmitted from the light source illuminates the adjacent key(s) or keypad from above. Preferably the lightguide or LED(s) are situated under keycaps having openings at the side of the key for illumination of the artwork or alphanumerics.

The present invention enables to use non transparent key(s) or keypad without expensive laser drilling of the keys. It also makes it possible to use materials in keys that have not been used before or have been expensive to manufacture.

The invention provides improved key location registration for users and greatly improved lighting color/material finish options i.e. UV-light on fluorecent pigment. Also more simple artwork techniques can be used, like etching or printing.

BRIEF DESCRIPTION OF THE DRAWINGS

The invention may be more fully understood through the following description in conjunction with the appended drawings, in which.

DESCRIPTION OF THE PREFERRED EMBODIMENTS

Figure 1:
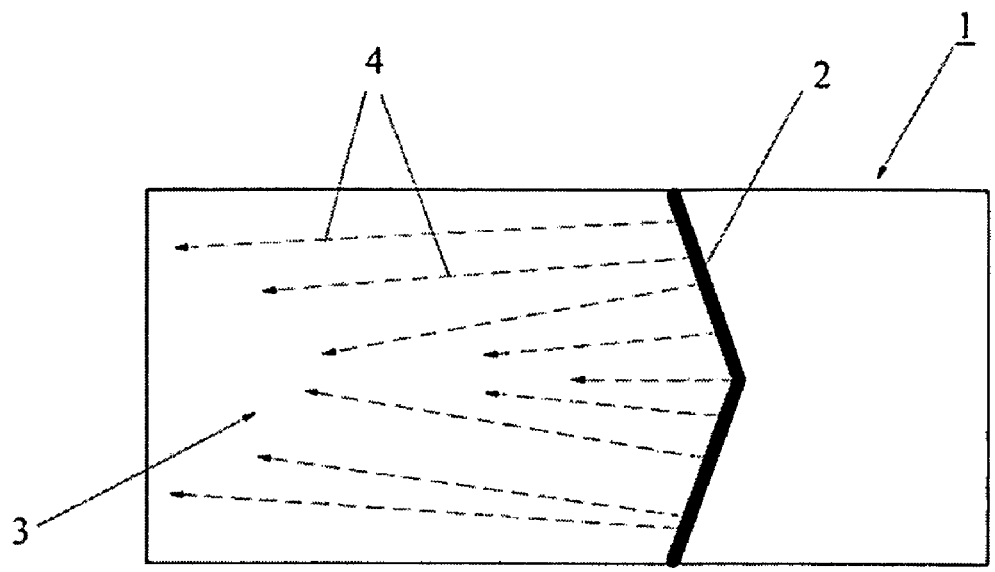
FIG. 1 is a top view of electrical device structure illuminated with an illumination module embodying the present invention.

In FIG. 1 is presented as a top view of an embodiment of illumination of electrical device 1, where the whole keypad of this device is illuminated with one illumination module 2 situated at one side of the keypad, preferably on the top or bottom side of the lit area 3. To the lit area 3 are arranged keys to form a keyboard and associated artwork or alphanumerics (not shown in the FIG. 1). The light is directed to the lit area 3 according to the arrows 4. Here the illumination module 2 is V-shaped, but any other shape can also be used, for example straight line, circular arc or another shape of curvature. The function of the illumination module 2 is better seen and explained with description of FIG. 2.

Figure 2:
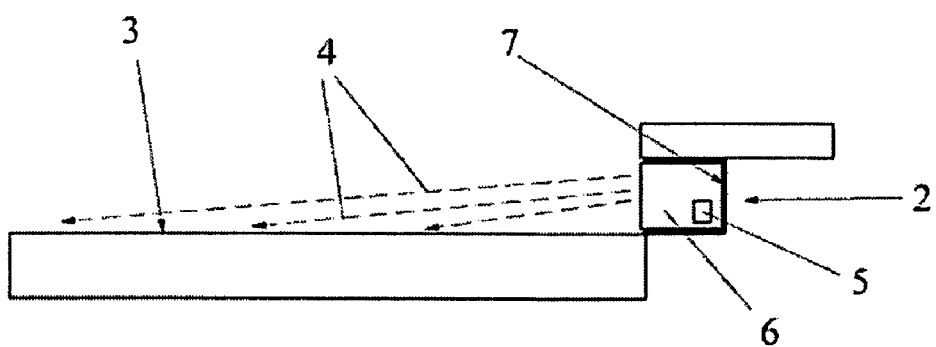
FIG. 2 is a side view of the embodiment presented in FIG. 1.

FIG. 2 shows the structure and place of the illumination module 2 in a cross-sectional side view. The illumination module 2 has a light source 5, preferably a LED(s), and a lens 6 and reflecting surface 7. The light is directed according to arrows 4 to the lit area 3 from above. The arrangement in FIG. 2 can also include another reflective surface at the opposite side of the illuminated area reflecting the light back towards the illumination module. This arrangement evens out the illumination, which otherwise tends to be less bright at the far end.

Figure 3:
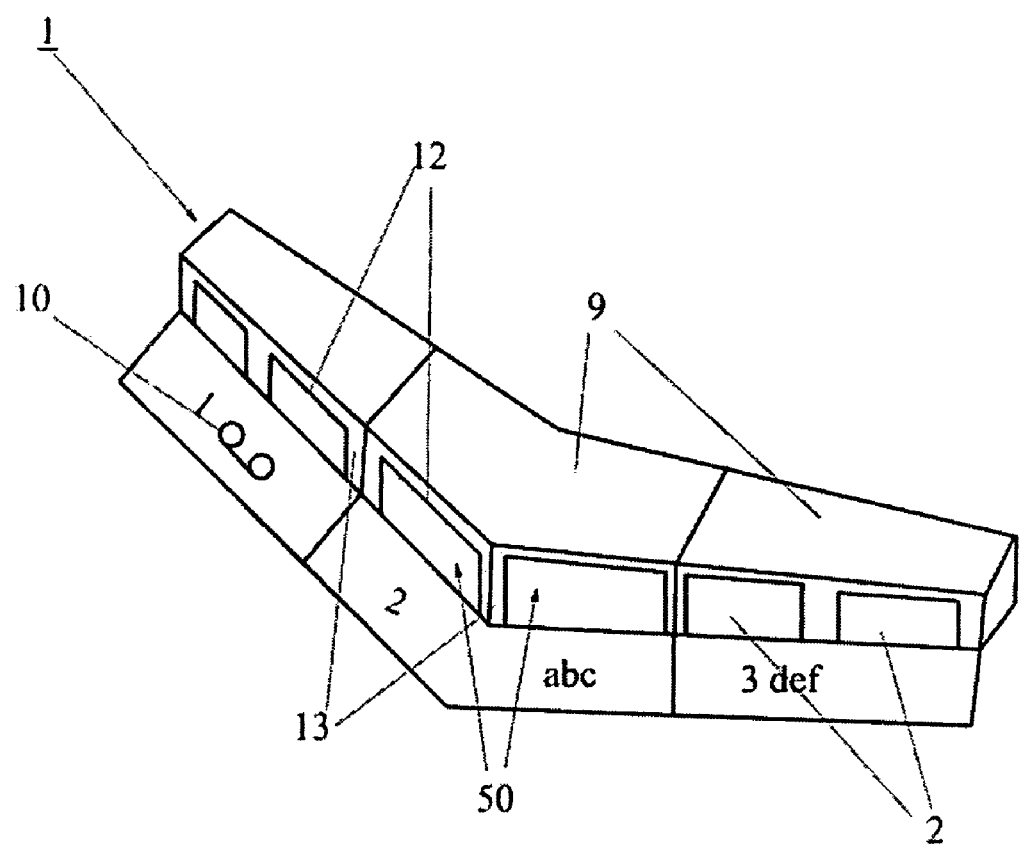
FIG. 3 is a part of a keyboard having illuminating system with multiple light sources in the keypad embodying the present invention.
Figure 5:
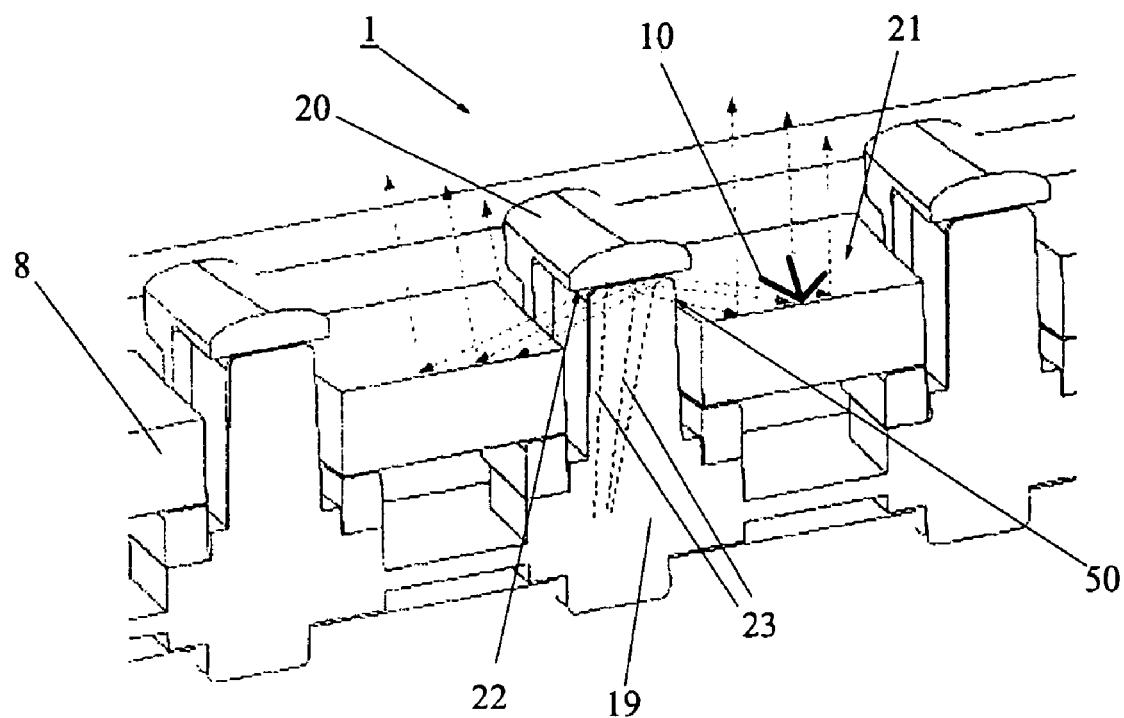
FIG. 5 is a cross-sectional side view of a keyboard with silicone lightguide used for the illumination embodying the present invention.

In FIG. 3 is presented a part of a top cover of a electronic device 1 (mobile phone) having multiple illumination modules 2 situated under every raised key 9 and at the same time to the side of each artwork 10 related to the adjacent key of the keypad so that the light is directed through the openings 12 of the side surface 13 of the key to the artwork from above. Here each key 9 has two straight illumination modules 2 emitting light to the top of the artwork 10 through light emitting surfaces 50. It is also possible to use one straight illumination module 2 having one or more openings 12 on the side surface 13 of the key 9 situated towards the artwork 10 to achieve the same effect (partly covered illumination module). Also some other arrangements can be used as illumination module 2. These arrangements are explained later on in FIG. 5 which shows this keymat design in cross-section. The modules that are referred to are the silicone lightguide up inside each key cavity. This design consists of three parts: keycap, silicone lightguide and top cover. Light emitting surface 50 can be in different embodiments of the invention for example a visible part of a lens (FIG. 2) or a lightguide (FIG. 5). In general through the light emitting surface 50 the light is transferred from illumination module to the air.

Figure 4:
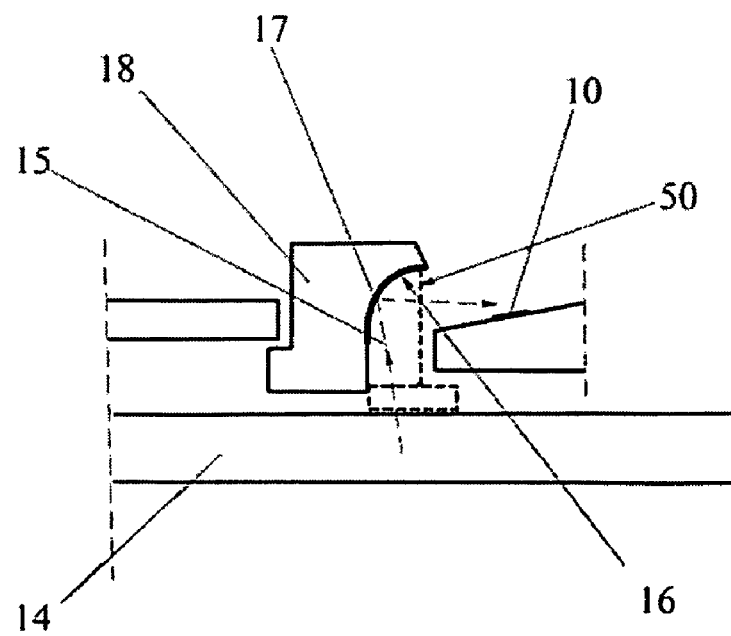
FIG. 4 is a cross-sectional side view of another embodiment of the invention reflecting the light to the artwork or alphanumerics.

In FIG. 4 is presented one embodiment for illumination of the artwork 10. Silicone lightguide 14 is emitting the light according to the arrows 15 to reflective surface 16, which illuminates artwork 10 from above. Light is directed to the top of the artwork 10 from above through light emitting surface 50 of the illuminating module, which surface has drawn in FIG. 4 with dashed line. Reflective surface 16 is arranged to the cavity 17 on the side of the key 18. Reflective surface 16 can be shaped as circular arc, straight line or some another shape of curvature. Artwork 10 (alphanumerics) can be raised or recessed for better visibility. Another possibility is to use for example UV-light and fluorecent pigment on artwork 10.

In FIG. 5 is presented as a cross-section the embodiment of FIG. 3 of the arrangement for illumination of the artwork 10 (alphanumerics). Top cover 8 of the mobile phone 1 is arranged to hold silicone lightguide 19 and keycap 20 on their place. Light is transmitted with silicone lightguide 19 to the surface 21 having printed (or manufactured with some other suitable technique) artwork 10 (alphanumerics) using under side of the key as a reflective surface 22. Light is directed according to the arrows 23 through the light emitting surface 50.

Figure 6:
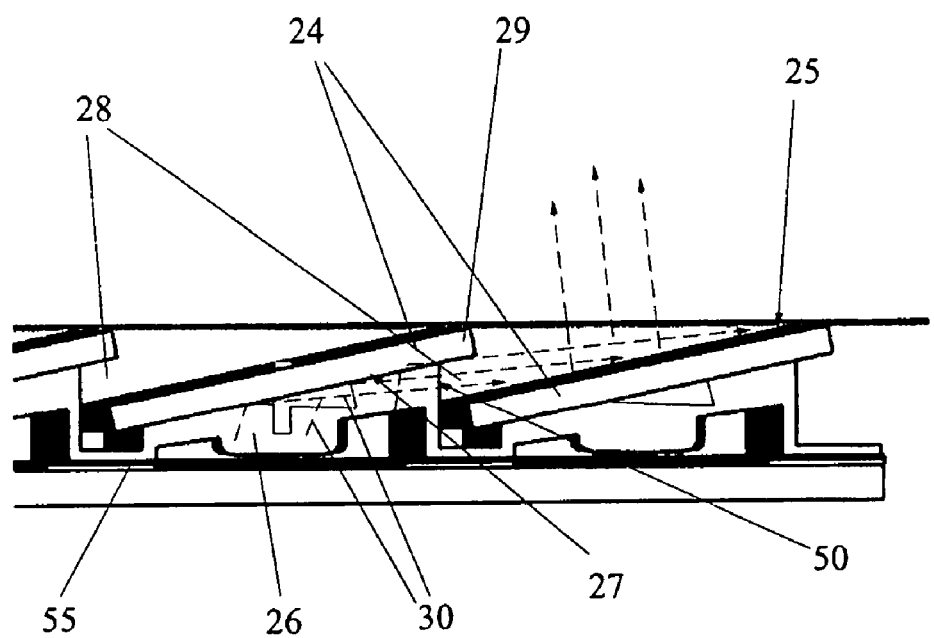
FIG. 6 is a cross-sectional side view of an embodiment of the present invention having tilted keys and silicone lightguide.

In FIG. 6 is presented an embodiment of the invention having tilted keys 24. The light is transmitted to the top surface 25 of keys 24 with silicone lightguide 26 using the under side of the non transparent key as a reflective surface 27. Illumination is arranged to the top surface 25 of keys 24 through openings 28 at the higher end 29 of adjacent tilted key 24. Light is directed according to the arrows 30 through the light emitting surface 50. In this embodiment the light source is electro luminance panel 55.

Figure 7:
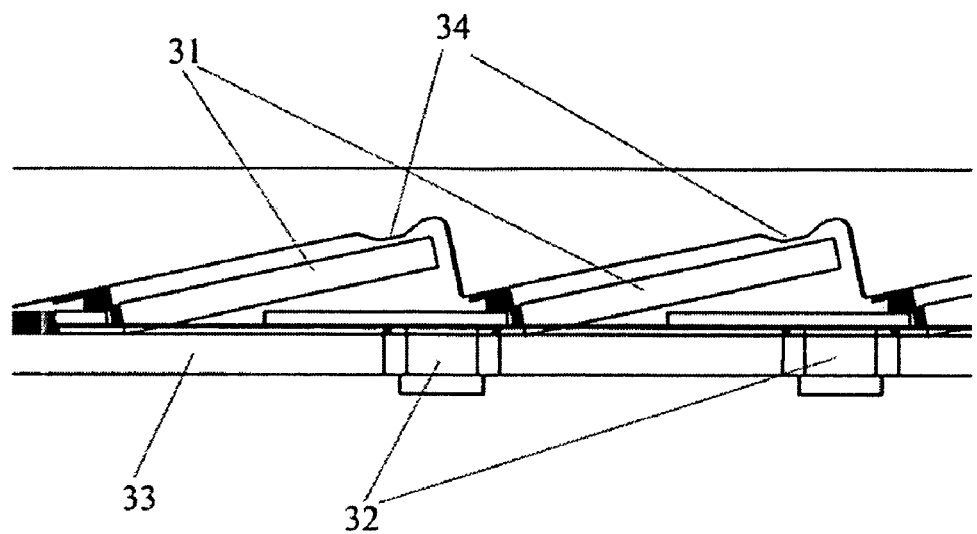
FIG. 7 is a cross-sectional side view of one embodiment of positioning the light source.

In FIG. 7 is presented the same embodiment having tilted keys 31 as in FIG. 6 but the view is through the key support rib. In this embodiment LEDs 32 are arranged in the board 33 of the mobile phone (through board LEDs). This embodiment also has bump stops 34 for key flange on anti-pick—top cover rail.

Figure 8:
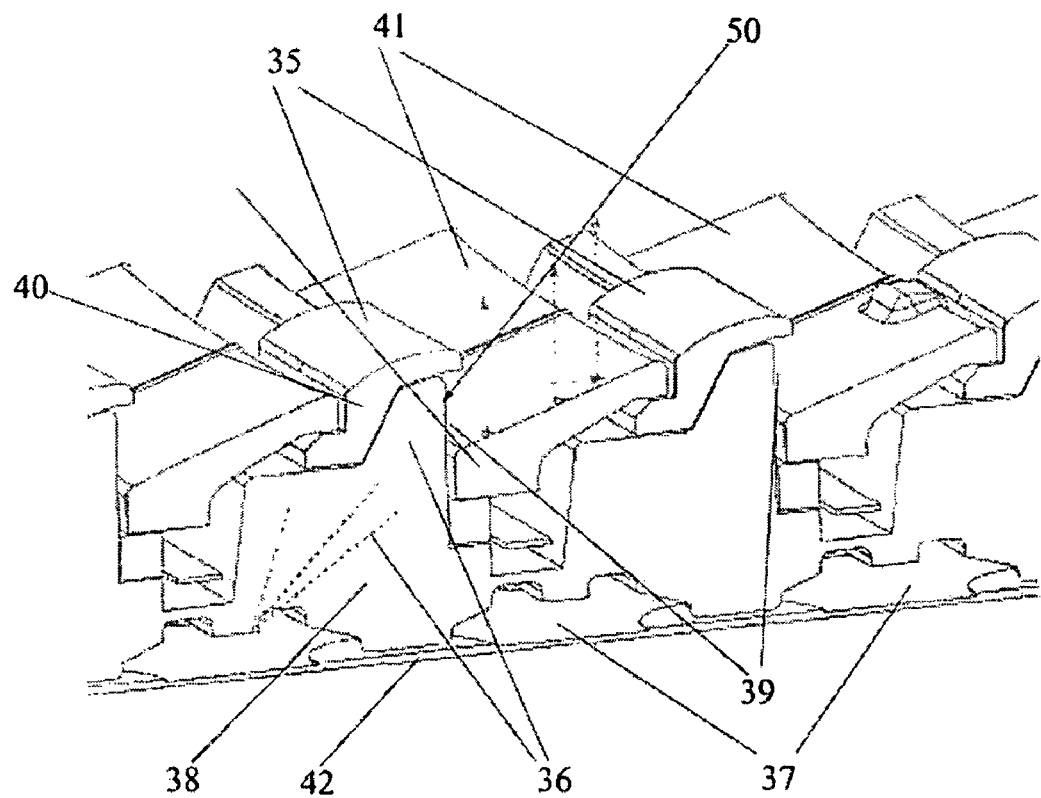
FIG. 8 is a cross-sectional side view of another embodiment of geometry of silicone lightguide and place of the light source.

In FIG. 8 is presented yet another embodiment of the invention for illumination of the artwork (not shown in FIG. 8) related to adjacent key 35. Light is directed according to the arrows 36 from LED 37 through the silicone lightguide 38 from under of the staggered and flanged keycap 40 through key opening 39 to ramped top cover face 41 with artwork related to the adjacent key. LEDs 37 are arranged in the cut domesheet 42, which sit on the PCB and a silicone mat used as a lightguide 38. In this embodiment the light is directed without any reflecting surface through the light emitting surface 50 of the lightguide 38 to the top of artwork.

Figure 9:
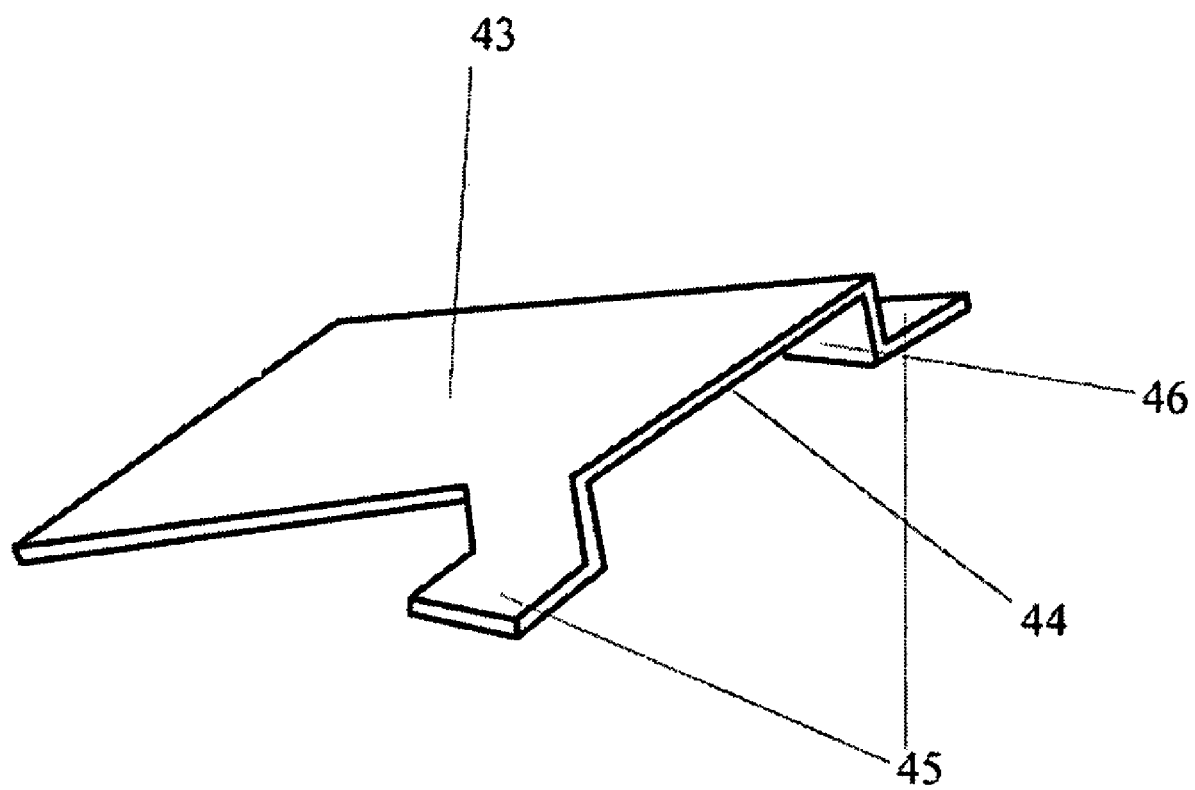
FIG. 9 is a perspective view of anti-pick solution of a tilted key structure of electrical device.

In FIG. 9 is presented one embodiment for anti-pick key construction for tilted keys 43. In the raised end 44 of the key 43 are arranged flanges 45 to the both sides of the key. These flanges 45 are situated under the top cover or rails to give anti pick. Light is directed with silicone lightguide under the raised end 44 of the key 43 from the opening 46 arranged there to illuminate adjacent key. The idea for illumination is same as in FIG. 6.

In these presented embodiments as an example of electric device is used a mobile phone but for anyone skilled in the art it is obvious that these solutions can also be used with other electric devices having key(s) or keyboards and artwork that needs to be illuminated, such as for example pocket calculators.

The present invention may be embodied in other specific forms without departing from its spirit or essential characteristics. The described embodiments are to be considered in all respect only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. An apparatus, comprising:
   at least one illumination module for illuminating artwork or alphanumerics of an electrical device; and
   at least one key comprising a top surface and a bottom surface, wherein the bottom surface of said at least one key is at least partially positioned on an upper surface of said at least one illumination module, wherein the bottom surface comprises a first portion and a second portion, and wherein the second portion is positioned on the upper surface of said at least one illumination module and the first portion is positioned at an angle with respect to the second portion;
   wherein said first portion of the bottom surface is configured to direct illumination from said bottom surface of said at least one key through air onto an outer surface of said electrical device adjacent to said at least one key.

2. The apparatus according to claim 1, wherein the illumination module comprises at least one light source.

3. The apparatus according to claim 2, wherein the at least one key comprises at least one reflective surface.

4. The apparatus according to claim 2, wherein the illumination module further comprises a lens.

5. The apparatus according to claim 1, wherein the illumination module comprises a lightguide.

6. The apparatus according to claim 5, wherein the at least one key comprises at least one reflective surface.

7. The apparatus according to claim 1, further comprising a reflective surface at the opposite side of the outer surface relative to the illumination module.

8. The apparatus according to claim 2, wherein the light source of the illumination module is situated under the outer surface.

9. The apparatus according to claim 1, wherein the at least one key is flat or tilted.

10. The apparatus according to claim 9, wherein a light emitting surface of the illumination module is situated under a key adjacent to the outer surface.

11. The electrical device having an apparatus according to claim 1 for illuminating artwork or alphanumerics from above.

12. The electrical device according to claim 11 wherein the electrical device is a mobile phone.

13. A method for illumination of the artwork or alphanumerics of an electrical device, comprising:
   providing at least one illumination module, and
   providing at least one key comprising a top surface and a bottom surface, wherein the bottom surface of said at least one key is at least partially positioned on an upper surface of said at least one illumination module, wherein the bottom surface comprises a first portion and a second portion positioned on the upper surface of said at least one illumination module, and wherein the first portion is positioned at an angle with respect to the second portion, wherein said first portion of the bottom surface is for directing illumination from said bottom surface of said at least one key through air onto an outer surface of said electrical device adjacent to said at least one key.

14. An apparatus, comprising:
   means for providing illumination for illuminating artwork or alphanumerics of an electrical device, and
   means for directing illumination from said means for providing illumination through air onto an outer surface of said electrical device adjacent to means for emitting illumination, wherein said means for directing comprises a top surface and a bottom surface, wherein the bottom surface comprises a first portion and a second portion positioned on an upper surface of said means for providing illumination, and wherein said first portion is positioned at an angle with respect to said second portion.

15. The apparatus of claim 14, wherein said means for providing illumination comprises means for providing a source of light.

16. The apparatus of claim 15, wherein said means for providing a source of light is a light emitting diode.

17. The apparatus of claim 2, wherein said at least one light source is a light emitting diode.

18. The apparatus of claim 15, wherein said means for providing a source of light is an electro luminance panel.

19. The apparatus of claim 2, wherein said at least one light source is an electro luminance panel.

* * * * *